US009668155B2

(12) United States Patent
Keskitalo

(10) Patent No.: US 9,668,155 B2
(45) Date of Patent: May 30, 2017

(54) METHOD AND APPARATUS OF PERFORMING RADIO MEASUREMENT IN

(75) Inventor: Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 363 days.

(21) Appl. No.: 13/980,725

(22) PCT Filed: Feb. 1, 2011

(86) PCT No.: PCT/FI2011/050085
§ 371 (c)(1),
(2), (4) Date: Aug. 21, 2013

(87) PCT Pub. No.: WO2012/104469
PCT Pub. Date: Aug. 9, 2012

(65) Prior Publication Data
US 2014/0045437 A1    Feb. 13, 2014

(51) Int. Cl.
*H04B 17/00*    (2015.01)
*H04W 24/10*    (2009.01)
*H04B 17/21*    (2015.01)

(52) U.S. Cl.
CPC ............ *H04W 24/10* (2013.01); *H04B 17/21* (2015.01)

(58) Field of Classification Search
CPC ... H04W 24/08; H04W 24/00; H04W 64/006; H04W 4/02; H04W 64/00; H04W 4/023; H04W 4/028; H04W 4/04; H04W 64/003
USPC ........ 455/67.11, 67.14, 404.2, 440, 443, 453
See application file for complete search history.

(56) References Cited

U.S. PATENT DOCUMENTS 8,195,249 B2 *  6/2012  Abdel-Kader ........ H04W 48/16
                                                    370/328
2008/0151762 A1  6/2008  Armstrong et al.

FOREIGN PATENT DOCUMENTS

EP       2117135       * 11/2009
WO       2008016799      2/2008

OTHER PUBLICATIONS

International Search Report received for corresponding Patent Cooperation Treaty Application No. PCT/FI2011/050085, dated Jun. 12, 2011, 3 pages.

* cited by examiner

*Primary Examiner* — Alejandro Rivero
*Assistant Examiner* — Angelica M Perez
(74) *Attorney, Agent, or Firm* — Seppo Laine Oy

(57) ABSTRACT

Responsive to receiving a request for a measurement in a mobile, the mobile determines whether time instances associated with the measurement coincide with time instances of location estimate availability in the mobile. Responsive to determining that location estimates are not available for a substantial fraction of the time instances when the measurement is requested, the mobile changes the time instances for the measurement and/or the time instances of location estimate availability to increase the availability of location estimates for the measurements.

18 Claims, 4 Drawing Sheets

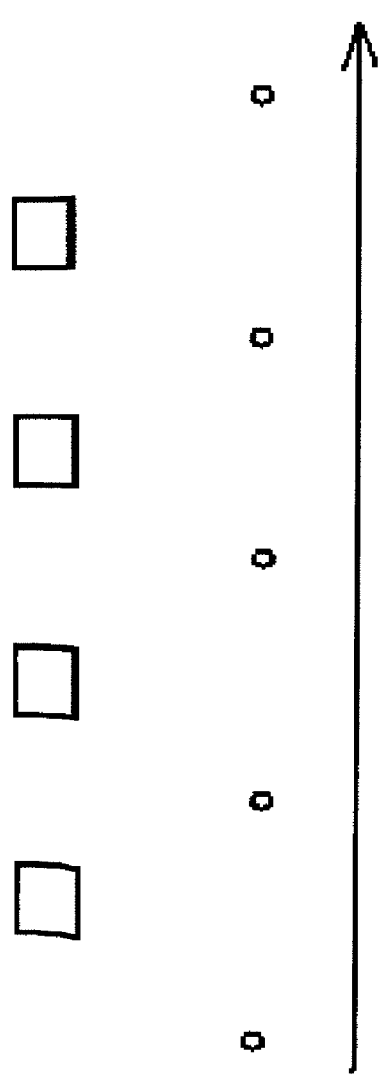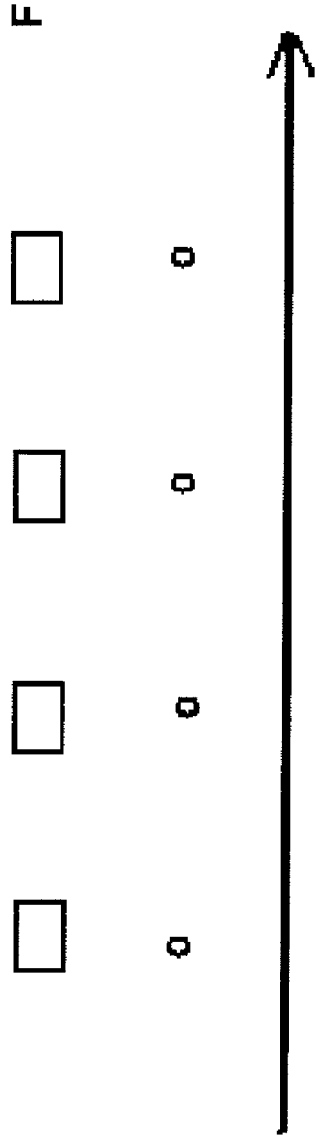

METHOD AND APPARATUS OF
PERFORMING RADIO MEASUREMENT IN

RELATED APPLICATION

This application was originally filed as PCT Application No. PCT/FI2011/050085 filed Feb. 1, 2011.

TECHNICAL FIELD

The present application relates generally to performing measurements in mobile units and reporting results thereof to at least one network.

BACKGROUND

Operators of radio networks, such as cellular communication networks, may perform so-called drive tests wherein test equipment is moved within a coverage area of the network to determine information of the network, for example parameters relating to the network. The parameters may include the extent of network coverage, datarates obtained, parameters of discovered coverage holes, islands of coverage of a first cell within an area of a second cell and parameters relating to network availability.

To obtain coverage information, and possibly other information relevant in a geographical sense, the test equipment may be furnished with information as to current location. For example, a test van used to move the test equipment around the coverage area may have a satellite positioning receiver to determine its location, and the test equipment may be functionally connected to the satellite positioning receiver to automatically associate measurement data with the location in which the measurement data was obtained. Another possible way to determine location is by analyzing received signals from a plurality of base stations comprised in a cellular network, a technique known as time difference of arrival, TDOA, multilateration.

Since drive tests may involve operating mobile test equipment, obtaining the information of the network incurs cost to network operators. An alternative to specialized test equipment could be to at least partially assign the task of obtaining information on the network to mobiles using services of the network, for example cellular telephones in a cellular communication network.

Mobiles performing measurements may also have access to estimates of their location, in which case the mobiles may be configured to associate measurement data with location estimates pertaining to the measurement data.

SUMMARY

Various aspects of examples of the invention are set out in the claims.

According to a first aspect of the present invention, there is provided an apparatus, comprising a transmitter configured to output at least one measurement report comprising at least one measurement result and a corresponding location indication, at least one processing core configured to determine a first pattern corresponding to time instances when measurements are requested, the at least one processing core further configured to determine a second pattern corresponding to time instances when location information is available, and the at least one processing core further configured to modify at least one of the first pattern and the second pattern so that the time instances corresponding to the first and second patterns overlap to a greater degree.

According to a second aspect of the present invention, there is provided a method comprising transmitting at least one measurement report comprising at least one measurement result and a corresponding location indication, determining a first pattern corresponding to time instances when measurements are requested, determining a second pattern corresponding to time instances when location information is available, and modifying at least one of the first pattern and the second pattern so that the time instances corresponding to the first and second patterns overlap to a greater degree.

According to a third aspect of the present invention, there is provided a computer program product comprising a non-transitory computer-readable medium bearing computer program code embodied therein for use with a computer, the computer program code comprising code for transmitting at least one measurement report comprising at least one measurement result and a corresponding location indication, code for determining a first pattern corresponding to time instances when measurements are requested, code for determining a second pattern corresponding to time instances when location information is available, and code for modifying at least one of the first pattern and the second pattern so that the time instances corresponding to the first and second patterns overlap to a greater degree.

BRIEF DESCRIPTION OF THE DRAWINGS

For a more complete understanding of example embodiments of the present invention, reference is now made to the following descriptions taken in connection with the accompanying drawings in which:

FIG. 3a illustrates two patterns defining time instants of requested measurements and availability of validity estimates according to some embodiments of the invention;

FIG. 3b illustrates two patterns defining time instants of requested measurements and availability of validity estimates according to some embodiments of the invention.

DETAILED DESCRIPTION OF THE DRAWINGS

An example embodiment of the present invention and its potential advantages are understood by referring to FIGS. 1 through 4 of the drawings.

Figure 1:
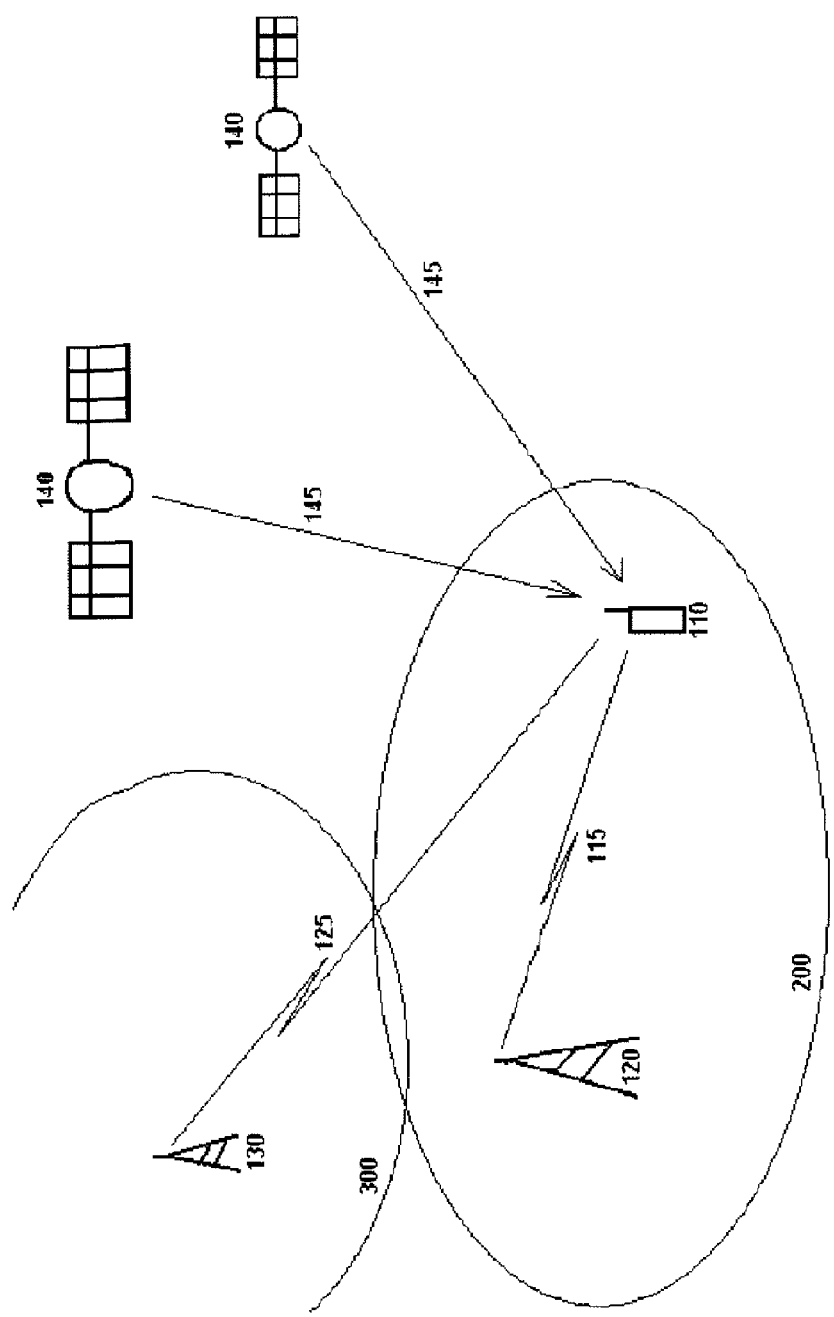
FIG. 1 illustrates a example system capable of supporting embodiments of the invention.

FIG. 1 illustrates a example system capable of supporting embodiments of the invention. Illustrated in FIG. 1 is mobile 110, which may be, for example, a cellular telephone, personal digital assistant, PDA, laptop computer, touchpad or other mobile device with wireless connectivity. Mobile 110 is located in cell 200, cell 200 being controlled by base station 120. Base station 120 may be configured to operate in conformance with at least one cellular technology, such as for example the global system for mobile communication, GSM, wideband code division multiple access, WCDMA or longe term evolution, LTE. Base station 120 may support more than one cellular technology. Base station 120 may additionally or alternatively to cellular technology support at least one local area technology, such a wireless local area network, WLAN.

Mobile 110 may communicate with base station 120 by means of link 115, which is typically a wireless link. Link 115 may comprise a downlink for conveying information from base station 120 to mobile 110, and an uplink for conveying information from mobile 110 to base station 120. Link 115 is operated in accordance with a technology supported by both mobile 110 and base station 120. According to the used technology, link 115 may operate according to time division multiple access, code division multiple access, orthogonal frequency division multiple access, or according to various combinations of these. In addition to communicating with base station 120, mobile 110 may communicate with base station 130 in cell 300. Communication between mobile 110 and base station 130 may occur over link 125, which may be substantially similar to link 115. Alternatively, link 125 may be unidirectional in the sense that mobile 110 only receives broadcast information from base station 130 to judge, for example, whether a handover from cell 200 to cell 300 may be necessary. In some embodiments, mobile 110 may be in a soft handover situation wherein it transmits information to base station 120 and base station 130 for combination in a network node comprised in the same network as base station 120 and base station 130, which is not illustrated. Mobile 110 may also receive information transmitted by both base station 120 and base station 130.

Mobile 110 may be furnished with a satellite positioning system receiver capable of receiving signals 145 from positioning satellites 140. Although two satellites and two signals are illustrated in FIG. 1 it is to be understood that a different number of satellites falls equally within the scope of the invention. The satellites are comprised in a satellite positioning constellation, such as for example global positioning system, GPS, the Galileo constellation or GLONASS. Mobile 110 may also be capable of receiving positioning signals from satellites comprised in more than one constellation, to derive a more accurate position estimate by averaging the estimates obtained from more than one constellation. Mobile 110 may be capable of assisted satellite positioning, wherein a position estimate is derived using information from base station 120 or base station 130 in addition to positioning signals 145.

Mobile 110 may derive an estimate of the present time from signals received from the network via links 115 and/or 125. Mobile may additionally or alternatively derive an estimate of the present time from satellites 140 via links 145.

In some embodiments, an operator of the network in which base stations 120 and 130 are comprised may decide to assign measurement tasks to mobiles, such as mobile 110. Measurements assigned may include mapping of signal levels within the radio network coverage area, coverage plotting, collection of measurement data from areas with weak downlink signal levels, identification of coverage holes, evaluation of downlink coverage for common channels, discovering islands of coverage, for example an island of cell 300 coverage enclosed inside cell 200, and verification of uplink coverage.

Mobile 110 may be configured to perform measurements when in an idle mode, which refers to a mode in which mobile 110 isn't in active data transmission to base stations. To configure an idle-mode measurement, which may be known as a logged measurement, the network may transmit to mobile 110 configuration information. Configuration information may comprise a duration for measurement, for example two hours, an area definition which defines the cell or cells in which measurements are to be carried out, and a periodicity for measurement which defines how frequently mobile 110 is to log information. In some embodiments, the area definition is expressed in terms of a tracking area or a plurality of tracking areas.

When performing idle mode measurements, mobile 110 may be configured to store measurement data in an internal memory. The measurement data may be associated with time and location information indicating when and where the measurement data was obtained. Location information may comprise positioning information obtained from satellites 140 or cell identifications, for example. For example when mobile 110 is attached to cell 200, an identifier of cell 200 will provide a location estimate, the accuracy of which depends on the size of cell 200. If cell 200 is small, the location information derived from its identifier is relatively accurate and if cell 200 is large, the location information derived from its identifier is less accurate. Measuring and storing data may be interrupted when mobile 110 transitions to an active state, such as RRC Connected, or hands over to a different technology. Measuring and storing may be resumed when mobile 110 is once more in an idle state in the network that requested the measurement.

When mobile 110 returns to an active state after being in an idle state, mobile 110 may be configured to indicate to base station 120 that mobile 110 has measurement data that could be reported. Responsive to the indication, the network may request mobile 110 to transmit the stored data and associated information, for example via link 115. Responsive to the request, mobile 110 may be configured to transmit the stored data and associated information, for example in ciphered mode to keep details of network performance secret. Mobile 110 may also store measurement data in ciphered form to keep details of network performance secret. When the configured measurement time ends and mobile 110 cannot immediately transmit the measured data, mobile 110 may retain the data and associated information, for example for 48 hours. After successfully transmitting the data and associated information to the network, or responsive to the aforementioned time period expiring without successful transmission, mobile 110 may erase its copy of the data and associated information.

In some embodiments, mobile 110 may be configured to perform measurements when in an active mode, such as a RRC Connected mode. These measurements may be called immediate measurements. In immediate measurements, mobile 110 reports measurement results as they accrue without storing them in an internal memory for any substantial period of time. Immediate measurements may be configured by configuration information like idle-mode measurements. Immediate measurements may be configured to be triggered periodically or responsive to events, such as, for example, a fluctuation in signal level, an initiation of a telephone call or a determination that mobile 110 is at a location defined in configuration information.

Configuration information configuring a measurement in mobile 110 may comprise periodicity information. The periodicity information may indicate a frequency at which mobile 110 is requested to perform a measurement. More generally, periodicity information may define a pattern which may comprise, for example, two periodicities applied to each other. An example of a pattern might be that mobile 110 is requested to perform ten measurements at ten-second intervals once per hour, or once every 30 minutes. Another example of a pattern would be that mobile 110 is requested to perform measurements at 5-second intervals between 14:00 and 18:00, and no measurements at other times. Depending on the embodiment, the periodicity at which measurements are repeated may vary. In some embodiments, several measurements may be conducted within a second, for example at 200 ms intervals. On the other hand, the interval may configured to be as much as an hour. Yet another examine would be that mobile 110 is requested to perform measurements at increasing intervals, wherein the interval may increase, for example, by five seconds for each interval.

Mobile 110 may determine that in addition to a pattern or periodicity associated with the measurement configuration information, also availability of location estimates follows a pattern or periodicity. For example, a satellite positioning subassembly of mobile 110 may be configured to output a position estimate every tenth, or ninth, second. Assuming that a periodicity of requested measurements is ten seconds and a periodicity of location estimate availability is also ten seconds, it may be that the most recent location estimate is, for example, eight seconds old each time a time instant occurs when mobile 110 should perform a measurement. Since mobile 110 is mobile, it may have substantially changed its position during the eight seconds, and consequently the location estimate may no longer be sufficiently accurate to be associated with the measurement data. Since the location estimate in this example is no longer usable, no measurement data can be stored since coverage mapping for an operator, for example, requires knowledge of where the measurement was taken.

Responsive to determining in mobile 110 that periodicities or patterns of requested measurements and location estimate availability do not overlap to a sufficient degree, mobile 110 may be configured to modify at least one of the patterns, or periodicities. For example, in the example above, mobile 110 may shift the measurement periodicity by delaying it by two seconds, in which case the location estimates would be obtained substantially simultaneously with the measurements. The same applies when patterns don't have the same periodicity, but a similar one. For example, if measurements are requested every 20 seconds and location estimates are available every 18 seconds, many time instances for measurements will not coincide with time instances for location estimate availability. In this case, too, it may be beneficial to delay the measurement time instances when the location estimate availability is drifting away from the measurement time instances. When a greater fraction of measurement opportunities are usable, the network will need to configure fewer mobiles to perform measurements.

When modifying the requested measurement pattern, mobile 110 may be configured to not modify the pattern associated with location estimate periodicity. In some embodiments mobile 110 may not even be capable of affecting the availability of location estimates. Modifying the requested measurement pattern may comprise delaying the pattern to cause the associated time instances of requested measurements to coincide to a greater degree with the availability of location estimates. If the network has specified a starting time for measurements, mobile 110 may optionally inform the network of the modification when reporting results, or mobile may alter the reporting or logging periodicity without explicit indication about the change. A short delay is unlikely to affect the usability of the measurements in any way from the network operator's point of view. In some embodiments, mobile 110 may be configured to determine if the measurement configuration information received from the network comprises an indication as to whether changing the pattern of requested measurements is allowed.

Alternatively, mobile 110 may be configured to modify the pattern of availability of location estimates. This requires that mobile 110 be capable of affecting the availability of location estimates by, for example, configuring the satellite positioning receiver circuitry comprised in mobile 110. In some embodiments, the satellite positioning receiver circuitry comprised in mobile 110 may be capable of deriving location estimates at a high frequency, for example once per second. In that case, when the satellite positioning receiver circuitry then outputs, for example, every tenth estimate, mobile 110 may modify the pattern by changing the instance and/or periodicity when estimates are provided from the satellite positioning receiver circuitry. This may effect a shift in pattern and/or a change in the periodicity itself, to cause a greater fraction of measurement opportunities to become usable.

Mobile 110 may determine a ratio to determine whether modifying at least one of the patterns is desirable. For example, by overlaying the time instances associated with both patterns, mobile 110 may be configured to determine the ratio of requested measurement time instances for which a valid location estimate is available to requested measurement time instances for which a valid location estimate is not available. By comparing the obtained ratio to a predetermined threshold ratio, mobile 110 may be capable of deciding whether modifying at least one of the patterns is desirable. The desirability may thus depend on the degree to which the patterns overlap.

Mobile 110 may be configured to consider a requested measurement time instance as having a valid location estimate if the time instance of the requested measurement differs by at most a validity time from the time instance of the closest location estimate.

The validity time may depend on an instantaneous movement rate of mobile 110. By comparing consecutive location estimates, mobile 110 is capable of calculating a velocity of mobile 110. In some embodiments, the velocity may be provided by a positioning function comprised in mobile 110, for example the the satellite positioning receiver circuitry. When the velocity is high, the location of mobile 110 changes rapidly and location estimates expire rapidly, meaning the validity time is short. Conversely, when the velocity is lower, the validity time is longer. Velocity is deemed to be high when consecutive location estimates differ from each other more, and velocity is deemed to be low when consecutive location estimates differ from each other less. In some cases, mobile 110 may be capable of interpolating or extrapolating location estimates from the obtained sequence of location estimates. This may make sense, for example, when mobile 110 is in a car that moves along a straight highway, making the validity time as such very short, but as the movement is very predictable mobile 110 may nonetheless obtain useful location estimates. Interpolation may also be used to increase the precision of location estimates when they are not exactly on the requested measurement time instances, but within the validity time or close to being within the validity time.

Mobile 110 may determine a mapping of network times used to determine time instances for requested measurements to satellite time used to determine time instances of location estimate availability. The mapping can be determined for example by monitoring the time instant when the location information becomes available. Location information attached with satellite time can then be mapped with the network time. The mapping may be used when comparing the patterns, for example to determine whether they overlap sufficiently or whether it is desirable to modify at least one of the patterns.

FIG. 3a illustrates two patterns defining time instants of requested measurements and availability of validity estimates according to some embodiments of the invention. Time progresses from left to right, and the horizontal arrow defines an axis of time. Time instances of requested measurements are illustrated as small circles, whereas time instances of available location estimates are illustrated as rectangles. The horizontal length of the rectangles corresponds in this example to a validity time of the location estimate. In FIG. 3a, the measurements do not coincide with valid location estimates, and a mobile configured thus would not be able to produce useful measurement data comprising location information.

FIG. 3b illustrates two patterns defining time instants of requested measurements and availability of validity estimates according to some embodiments of the invention. FIG. 3b corresponds substantially to FIG. 3a, except that at least one of the patterns has been modified by shifting so that measurement data can be obtained and provided with corresponding, valid location data since measurement time instances coincide with availability of valid location estimates.

Figure 4:
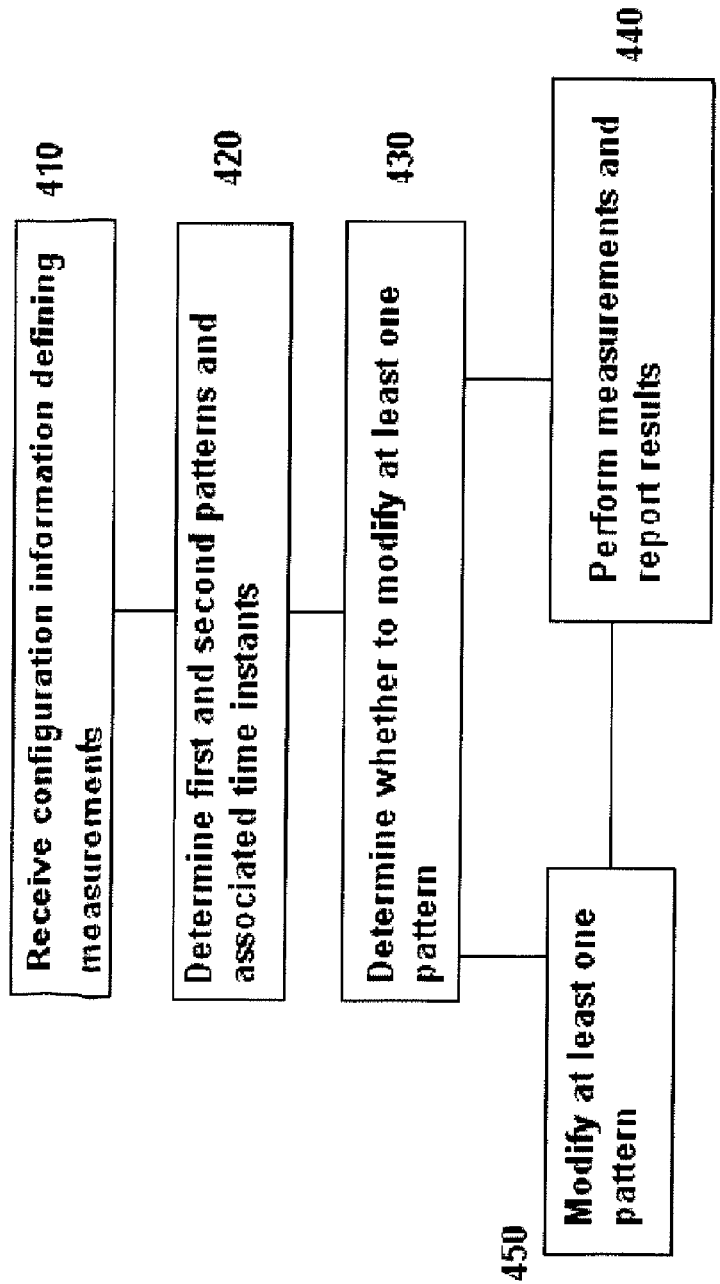
FIG. 4 is a flowgraph illustrating a method according to an example embodiment of the invention.

FIG. 4 is a flowgraph illustrating a method according to an example embodiment of the invention. In phase 410 a mobile, for example a mobile as illustrated in FIG. 1, receives configuration information from a network, the configuration information defining a measurement. The measurement may be defined in terms of a first pattern that defines a series of time instants, when the measurement is supposed to be repeatedly conducted. The configuration information may define, implicitly or explicitly, that the measurement should be associated with location estimates. Processing advances from phase 410 to phase 420. In phase 420, the first pattern is compared to a second pattern, the second pattern defining a series of time instants when estimates of location are available to the unit that received the configuration information in phase 410. Processing advances from phase 420 to phase 430. In phase 430, the unit determines whether to modify at least one of the patterns so as to cause the time instances associated therewith to coincide to a greater degree.

If it is determined that neither of the two patterns is to be modified, processing advances from phase 430 to phase 440. In phase 440, the measurement configured by the configuration information is conducted and results are reported to the network that sent the configuration information. Results may be reported to the network directly or, should the unit have moved to another network, indirectly via the another network.

If it is determined in phase 430 that at least one of the two patterns is to be modified, processing advances from phase 430 to phase 450. In phase 450 at least one of the two patterns is modified, as discussed above. After the modification, processing advances from phase 450 to phase 440.

Comprised in phase 440 is reporting results by transmitting at least one measurement report comprising at least one measurement result and a corresponding location indication. The transmitting may occur, for example, in a processor in which at least one processing core is comprised, for transmission to a radio transceiver for transmission over an air interface. A chip or processor where the transmitting may occur may thus be configured to transmit the information, for example by employing an I/O pin and internal serial port. Alternatively, the transmitting may occur at a radio transceiver for transmission over an air interface.

Figure 2:
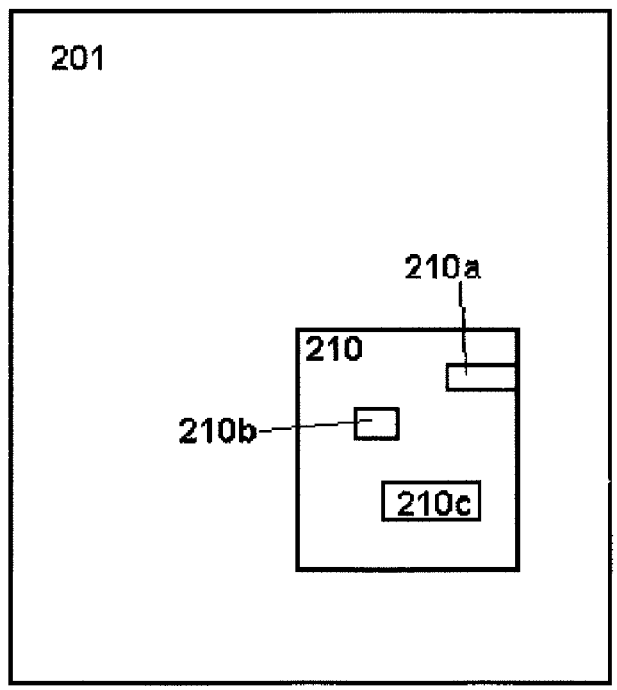
FIG. 2 illustrates an example apparatus 201 capable of supporting embodiments of the present invention.

FIG. 2 illustrates an example apparatus 201 capable of supporting embodiments of the present invention. The apparatus may correspond to mobile 110, or base station 120, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example configuration information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Without in any way limiting the scope, interpretation, or application of the claims appearing below, a technical effect of one or more of the example embodiments disclosed herein is that fewer mobiles may need to be configured by a network to perform measurements. Another technical effect of one or more of the example embodiments disclosed herein is that as fewer mobiles need to be configured to perform measurements, battery power of mobiles is conserved. Another technical effect of one or more of the example embodiments disclosed herein is that measurement data may become more useful since datapoints occur at more regular intervals.

Embodiments of the present invention may be implemented in software, hardware, application logic or a combination of software, hardware and application logic. The software, application logic and/or hardware may reside on memory 210a, control apparatus 210 or a subassembly of control apparatus 210, for example. If desired, part of the software, application logic and/or hardware may reside on memory external to control apparatus 210, part of the software, application logic and/or hardware may reside on memory internal to control apparatus 210, and part of the software, application logic and/or hardware may reside on separate hardware components. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    transmitter configured to output at least one measurement report comprising at least one measurement result and a corresponding location indication;
    at least one processing core configured to determine a first pattern corresponding to a plurality of time instances, occurring at a first periodicity, when measurements to produce the at least one measurement result are requested;
    the at least one processing core further configured to determine a second pattern corresponding to a second plurality of time instances, occurring at a second periodicity, when location indications are available, the location indications indicating a location of the apparatus; and
    the at least one processing core further configured to modify at least one of the first pattern and the second pattern so that an overlap between the time instances corresponding to the first and second patterns is increased when the overlap is less than a predetermined threshold.

2. The apparatus according to claim 1, wherein the at least one measurement result comprises at least one of: a signal level received from a cellular network node, an indication of a coverage gap and an indication of downlink coverage for common channels.

3. The apparatus according to claim 1, wherein the at least one processing core is configured to modify the first pattern and leave the second pattern unmodified so that the overlap between the time instances corresponding to the first and second patterns is increased.

4. The apparatus according to claim 3, wherein modifying the first pattern comprises modifying the first pattern so that time instances corresponding to the first pattern are shifted forward in time.

5. The apparatus according to claim 1, wherein the at least one processing core is configured to modify the second pattern and leave the first pattern unmodified so that the overlap between the time instances corresponding to the first and second patterns is increased.

6. The apparatus according to claim 1, wherein the at least one processing core is configured to consider two time instances as overlapping when the two instances are separated from each other by at most a validity time.

7. The apparatus according to claim 6, wherein the validity time depends on a velocity estimate which indicates an estimate of how fast the apparatus is moving.

8. The apparatus according to claim 6, wherein a first of two time instances being associated with a time according to a network time and a second of two time instances being associated with a time according to a satellite system time are compared after synchronizing the time according to a network and the time according to a satellite system.

9. The apparatus according to claim 1, wherein the apparatus comprises a mobile communication device, the apparatus further comprising an antenna coupled to a transceiver, the antenna configured to provide signals to the transceiver.

10. A method, comprising:
    transmitting, using a transmitter comprised in an apparatus, at least one measurement report comprising at least one measurement result and a corresponding location indication;
    determining a first pattern corresponding to a plurality of time instances, occurring at a first periodicity, when measurements to produce the at least one measurement result are requested;
    determining a second pattern corresponding to a second plurality of time instances, occurring at a second periodicity, when location indications are available, the location Indications indicating a location of the apparatus; and
    modifying at least one of the first pattern and the second pattern so that an overlap between the time instances corresponding to the first and second patterns is increased when the overlap is less than a predetermined threshold.

11. The method according to claim 10, wherein the at least one measurement result comprises at least one of: a signal level received from a cellular network node, an indication of a coverage gap and an indication of downlink coverage for common channels.

12. The method according to claim 10, wherein the modifying comprises modifying the first pattern and leaving the second pattern unmodified so that the overlap between the time instances corresponding to the first and second patterns is increased.

13. The method according to claim 12, wherein the modifying of the first pattern comprises modifying the first pattern so that time instances corresponding to the first pattern are shifted forward in time.

14. The method according to claim 10, wherein the modifying comprises modifying the second pattern and leaving the first pattern unmodified so the overlap between the time instances corresponding to the first and second patterns is increased.

15. The method according to claim 10, wherein two time instances are considered as overlapping when the two instances are separated from each other by at most a validity time.

16. The method according to claim 15, wherein the validity time depends on a velocity estimate which indicates an estimate of how fast an apparatus performing the method is moving.

17. The method according to claim 15, wherein a first of two time instances being associated with a time according to a network time and a second of two time instances being associated with a time according to a satellite system time are compared after synchronizing the time according to a network and the time according to a satellite system.

18. A computer program product comprising a non-transitory computer-readable medium bearing computer program code embodied therein for use with a computer, the computer program code comprising:

code for transmitting at least one measurement report comprising at least one measurement result and a corresponding location indication;

code for determining a first pattern corresponding to a plurality of time instances, occurring at a first periodicity, when measurements to produce the at least one measurement result are requested;

code for determining a second pattern corresponding to a second plurality of per time instances, occurring at a second periodicity, when location indications are available, the location indications indicating a location of the apparatus; and code for modifying at least one of the first pattern and the second pattern so that an overlap between the time instances corresponding to the first and second patterns is increased when the overlap is less than a predetermined threshold.

* * * * *